United States Patent [19]

Sando et al.

[11] 4,064,582
[45] Dec. 27, 1977

[54] PRESSURE SEALING METHOD

[75] Inventors: Yoshikazu Sando; Hiroshi Ishidoshiro, both of Wakayama, Japan

[73] Assignee: Sando Iron Works Co., Ltd., Japan

[21] Appl. No.: 658,876

[22] Filed: Feb. 18, 1976

[30] Foreign Application Priority Data

Mar. 11, 1975 Japan .............................. 50-29235
Mar. 11, 1975 Japan .............................. 50-29236

[51] Int. Cl.² .............................. D06B 23/18
[52] U.S. Cl. .............................. 8/149.3; 34/242; 68/5 E
[58] Field of Search .......... 68/5 E; 34/242; 8/149.3; 277/1

[56] References Cited

U.S. PATENT DOCUMENTS

| 2,606,046 | 8/1952 | Bonner et al. | 34/242 |
| 3,343,379 | 9/1967 | Duis et al. | 68/5 E |
| 3,394,940 | 7/1968 | Lane | 68/5 E X |
| 3,645,116 | 2/1972 | Peter | 68/5 E |
| 3,651,671 | 3/1972 | Sando et al. | 68/5 E |
| 3,891,223 | 6/1975 | Sonnen | 68/5 E X |

FOREIGN PATENT DOCUMENTS

| 697,673 | 11/1964 | Canada | 34/242 |
| 12,607 | 2/1963 | Japan | 68/5 E |

Primary Examiner—Philip R. Coe
Attorney, Agent, or Firm—Toren, McGeady and Stanger

[57] ABSTRACT

A pressure sealing method for sealing the inlet and outlet parts of a high pressure steamer which performs steaming with saturated steam of high temperature and high pressure in processing a textile product for desizing, scouring, bleaching, dyeing or the like. A pair or more than one pair of air pressure chambers made of a gas or fluid exudative material formed in a hollow cylindrical or semicylindrical shape or made of a gas impermeable thin plate are arranged to confront one another at the inlet or outlet part in the high steamer for the entry or exit of the treated product. The pressure of a pressure chamber of the steamer and that of atmospheric parts are shut off by one pair or more than one pair of nipping faces of these air pressure chambers which are pressed against one another. The treated product is allowed to pass through the inlet and outlet parts against the combined pressure developed between the nipping faces.

2 Claims, 7 Drawing Figures

PRESSURE SEALING METHOD

BACKGROUND OF THE INVENTION

This invention relates to a method for pressure sealing the openings which are provided for the continuously entry and exit of a textile product such as a cloth material in a high pressure steamer which performs steaming with saturated steam of high temperature and high pressure in processing the textile product for desizing, scouring, bleaching, dyeing or the like.

In accordance with the conventional pressure sealing method, rubber nip rolls are usually arranged to confront and are to be in pressed contact with each other. However, the rate of abrasion of the circumferential surfaces of such rubber rolls is so high that their service life is too short. Thus, it has been a problem to find a method for making their service life longer, i.e. to find a better material for such nip rolls.

SUMMARY OF THE INVENTION:

It is therefore an object of the present invention to provide a pressure sealing method which solves the above stated problem by eliminating the shortcoming of the conventional method.

To attain this object, a pair or more than one pair of hollow, cylindrical or semicylindrical air pressure chambers made of a material that allows a gas or fluid to exude from inside to a suitable degree are disposed on opposite sides to confront one another in such a manner as to shut off the pressure of the pressure chamber of the steamer and that of atmospheric parts with the nipping faces of these confronting air pressure chambers while the textile product being processed by the steamer is arranged to pass between these nipping faces.

It is the second object of this invention to provide a nip sealing method wherein bag-shaped air pressure chambers are formed at the bent tip portions of thin plates of a gas impermeable material, such as metal, Teflon, rubber or synthetic fiber. Both side ends of each of the thin plates are secured to a supporting frame. One pair or more than one pair of the air pressure chambers thus arranged are disposed to confront one another with their circumferential faces pressing one another to form a textile product entry or exit part of a steamer in such a manner that a textile product such as a cloth material passes through the part against the combined pressure developed between the mutually pressing faces to come in and go out from the high temperature, high pressure chamber of the steamer.

More specifically stated, the second object is attained by the following arrangement: The confronting air pressure chambers automatically separate from each other to provide a gap between them according to the state or the width and thickness of the cloth material being processed when the cloth material is passing between these pressure chambers. While the cloth material is passing, the tightly shut condition brought about with these confronting, mutually pressing air pressure chambers is still maintained at the parts between them where the cloth is not passing so that a good sealing effect can be maintained there. Although the tip of the cloth being processed is pressed by the supply of air pressure into the void space inside the confronting bag shaped pressure chambers, the bag shape portions of thin plates yield inwards to give way to the passing cloth when it is thick and swell outward when the cloth material is thin. In this manner, the air pressure is self-adjustable to constant pressure according to the thickness of the passing cloth material so that the sealing effect is obtained by a constant internal pressure. Furthermore, according to this invention, the inlet and outlet openings for passing cloth materials can be arranged either in separate locations or the same location on the steamer.

BRIEF DESCRIPTION OF THE DRAWINGS:

The accompanying drawings illustrate the embodiment examples of this invention respectively.

DESCRIPTION OF THE PREFERRED EMBODIMENTS

The further objects, features and details of this invention will become manifest from the following description of the preferred embodiment examples of this invention taken in conjunction with the accompanying drawings.

Figure 1:
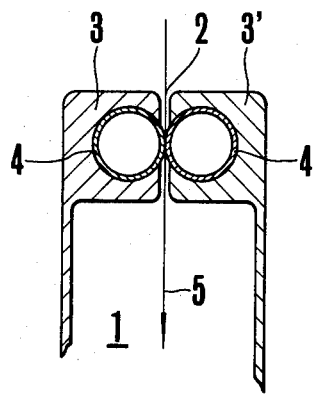
FIG. 1 is a longitudinal section illustrating the arrangement of a first example of embodiment.

EXAMPLE 1: (Refer to FIGS. 1 and 3)

In a pressure chamber 1 such as the one generally employed for a high pressure steamer, hose carrying metal pieces 3 and 3' are disposed opposite one another to closely confront each other at an entrance or exit opening provided for a cloth material 5 to be processed, with a narrow gap 2 left open for passing the cloth material between the oppositely confronting metal pieces. Fire extinguishing hoses 4 and 4' are fitted into the recesses formed in the metal pieces to be held there respectively. The hoses are brought into pressed contact with each other by supplying air pressure to each of them. The nipping faces of these hoses are arranged to leak a slight amount of air respectively through their net-like knit structure.

The cloth material 5 passes through between these hoses against their nipping pressure. When the cloth 5 passes therebetween, the hoses 4 and 4' remain unturned while a suitable amount of air exudes from the nipping faces to allow the cloth to smoothly pass through there without abrasion.

Figure 3:
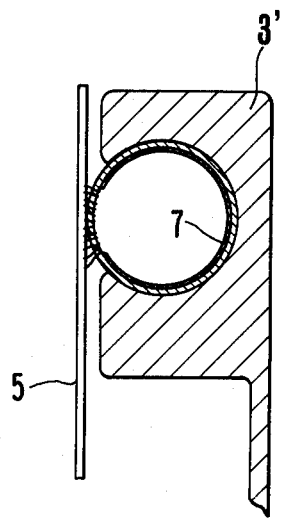
FIG. 3 is an enlarged longitudinal section illustrating half of the arrangement of the first example shown in FIG. 1.

Inside each hose 4 or 4', there is provided a lining as sealing member 7 to completely cover the inside except the nipping portion as illustrated in detail in FIG. 3. This ensures that the air pressure never exudes from any parts other than the nipping face. With a suitable amount of air exuding through the nipping face toward the cloth material 5 in FIG. 3, this ensures the above mentioned advantage.

EXAMPLE 2: (FIG. 2)

Figure 2:
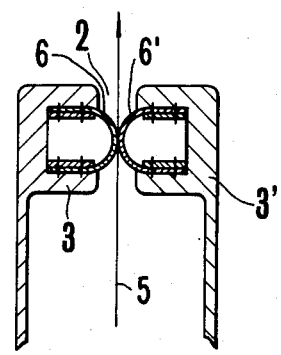
FIG. 2 is a longitudinal section illustrating a second example of embodiment.

Referring to FIG. 2, the hose 4 and 4' which are employed in Example 1 are replaced with sheet members 6 and 6' made of the same material. The sheet members 6 and 6' are fixed to the metal pieces 3 and 3' respectively and are allowed to swell out in a semicylindrical shape toward each other to be in pressed contact with each other. With the exception of this, other details are identical with Example 1.

The pressure inside a pressure chamber and the pressure inside of the hoses or sheet members are adjusted as follows: The pressure of the pressure chamber is first detected and the detected pressure is fed back to the air pressure supply to the hoses or sheet members to adjust the pressure of the latter to be higher than the former by about 0.2 to 1.0 kg/cm$^2$. It is also possible to use water or other suitable hydraulic fluid in place of air pressure.

EXAMPLE 3: (FIGS. 4 and 5)

Figure 4:
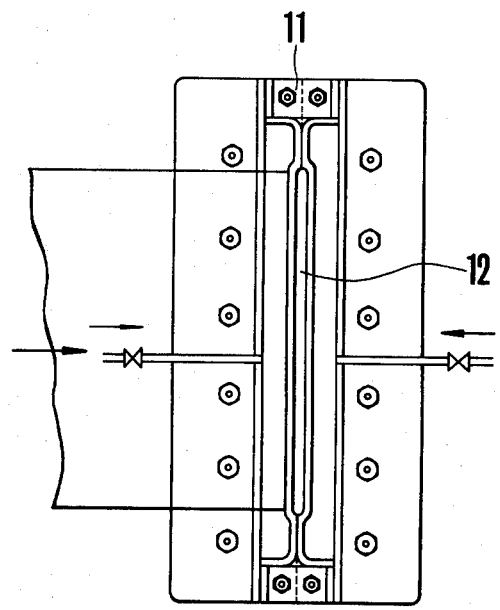
FIG. 4 is a plan view illustrating the arrangement of a third example of embodiment.
Figure 5:
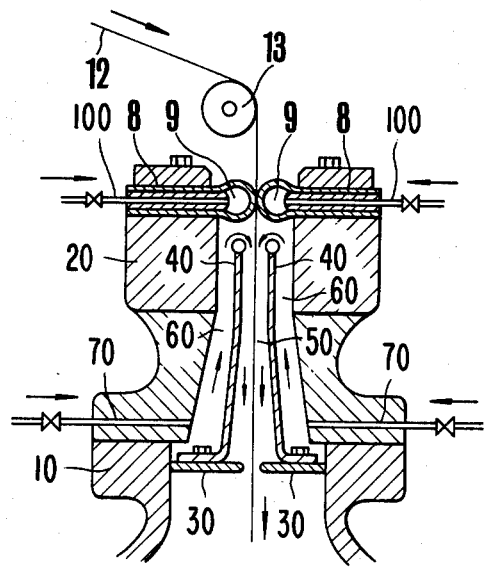
FIG. 5 is a longitudinal section illustrating the third embodiment example.

Referring to FIGS. 4 and 5, a seal block 20 is mounted on the opening 10 of a high pressure steamer. The seal block 20 is provided with an opening which communicates with the above stated opening 10.

Valve seats 30 are disposed on both sides of the opening 1 with partition walls 40 respectively installed on these valve seats to divide the opening into a cloth passage 50 in the middle and air pressure passages 60 on both sides of the cloth passage. These passages 50 and 60 are intercommunicating at their upper parts. Air pressure blowing pipes 70 are respectively connected to the bottoms of the air pressure passages 60 for the purpose of supplying air pressure thereto.

In the upper part of the seal block 20, there are provided bag-shaped thin plate members 8 which are formed of flexible thin plates to extend toward each other. Air pressure chambers 9 which are provided inside the bag-shaped portions of the thin plate members 8 are respectively connected to air pressure blowing pipes 100.

The edges of the thin plate members 8 are tightly fitted to the seal block 20 by keep plates 11. The cloth material 12 being processed moves round a crease removing roll 13, passes between the pressed contact faces of the thin plate members 8 and further moves passing through the passage 50 before it is introduced into the high pressure steamer. When the cloth material 12 passes the seal block 20, the nipping pressure at the pressed contact faces of the thin plate members 8 is adjustable by adjusting the air pressure inside the air pressure chambers 9 according to the thickness of the cloth material being processed.

Pressurized air of a pressure corresponding to the internal pressure of the high steamer flows from the passages 60 to the passage 50 in the directions indicated by arrows. A mixture of the pressurized air and the high pressure steam coming from the high pressure steamer is discharged at the bottom of the passage 50. By this arrangement, the internal pressure of the high pressure steamer is air sealed effectively.

Figure 6:
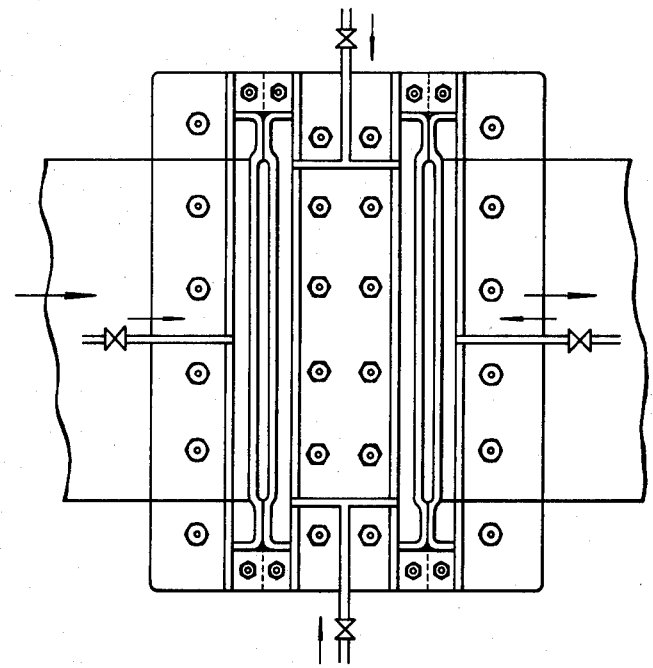
FIG. 6 is a plan view illustrating the arrangement of a fourth example.
Figure 7:
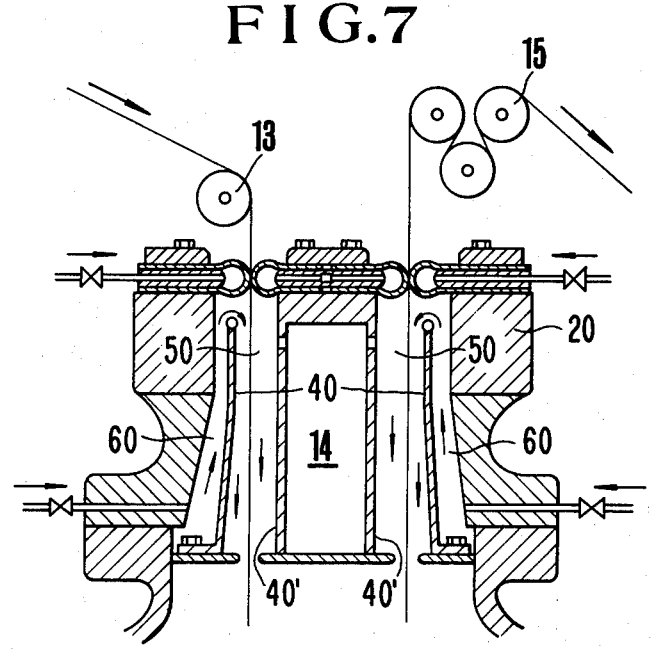
FIG. 7 is a longitudinal section illustrating the same arrangement of the fourth example.

EXAMPLE 4: (FIGS. 6 and 7)

In this example, a cloth inlet opening and a cloth outlet opening are disposed side by side in the same place on the same side. In other words, the seal block 20 is provided with two openings, each opening separately having a partition wall 40 forming the air pressure passage 60 and the cloth passage 50.

An air pressure chamber 14 communicating with the cloth passage 50 is provided between center partition walls 40' which are positioned between the spaced cloth passages 50. However, the air pressure chamber 14 may be dispensable in some cases. In FIG. 7, the reference numeral 15 indicates delivery rolls.

What is claimed is:

1. A method of pressure sealing at least one of the inlet into and outlet from the pressure chamber in a high pressure steamer in which a cloth material is processed, comprising the steps of forming a pair of oppositely disposed closed hollow structures having resilient contacting surfaces with the contacting surfaces arranged to provide one of an inlet into or outlet from the pressure chamber of the high pressure steamer, passing a cloth material between the resilient contacting surfaces of the hollow structure, supplying pressurized air into the hollow structures and adjusting the air pressure in accordance with the thickness of the cloth material being processed for providing the desired nipping pressure therebetween, forming a passageway extending inwardly into the steamer from the hollow structures into the pressure chamber, partitioning the passageway into a central cloth passage flanked on both sides by air pressure passages with the air pressure passages disposed in communication with the cloth passage adjacent the hollow structures, supplying pressurized air into the air passages at a location remote from the hollow structures with the pressure of the pressurized air supplied corresponding to the internal pressure in the pressure chamber of the high pressure steamer so that the pressurized air flows first through the air passages toward the hollow structures where it reverses direction entering into the cloth passage and then passes from the cloth passage into the pressure chamber.

2. A pressure sealing device for use in at least one of the inlet into and outlet from the pressure chamber in a high pressure steamer, comprising a seal block forming an elongated passageway into the pressure chamber, the passageway having a first end adjacent the pressure chamber and a second end remote from the pressure chamber, a pair of flexible thin plate members each secured to said seal block and located at the second end of said passageway, said plate members each extending into the passageway from an opposite side thereof, each said thin plate member folded over on itself and forming a closed pressure chamber extending inwardly from said seal block with the opposed surfaces of said thin plate members disposed in surface contact and forming a seal closure for the second end of the passageway, first means for supplying pressurized air within the pressure chambers formed by said thin plate members and for adjusting the pressure of the pressurized air within the pressure chambers for providing the requisite nipping pressure for cloth material passing through the passageway formed by said seal block and between the opposed surfaces of said thin plate members, partition means located within said passageway inwardly of said thin plate members and extending from the first end to the second end thereof, said partition means dividing the passageway in the direction extending between the first and second ends thereof into a central cloth passage flanked on each side by an air pressure passage with said air pressure passages being in communication with said cloth passage adjacent said thin plate members at the second end of said passage, and second means for supplying pressurized air into the pressure passages at the first end of said passageway at a pressure corresponding to the internal pressure within the pressure chamber of the high pressure steamer so that the pressurized air flows along the air pressure passages from the first end to the second end of the passageway and then from the air pressure passages into the cloth passage adjacent the second end of said passageway within said seal block where it flows toward and then into the pressure chamber in said high pressure steamer.

* * * * *